United States Patent
Lee et al.

(10) Patent No.: US 10,457,280 B2
(45) Date of Patent: Oct. 29, 2019

(54) SYSTEM AND METHOD FOR CONTROLLING MOBILE WARNING TRIANGLE

(71) Applicant: HONGFUJIN PRECISION ELECTRONICS (TIANJIN) CO., LTD., Tianjin (CN)

(72) Inventors: You-Yun Lee, New Taipei (TW); Ling-Chieh Tai, New Taipei (TW); Kai-Fan Lee, New Taipei (TW); Shih-Yin Tseng, New Taipei (TW)

(73) Assignee: HONGFUJIN PRECISION ELECTRONICS (TIANJIN)CO., LTD., Tianjin (CN)

( * ) Notice: Subject to any disclaimer, the term of this patent is extended or adjusted under 35 U.S.C. 154(b) by 218 days.

(21) Appl. No.: 15/610,722

(22) Filed: Jun. 1, 2017

(65) Prior Publication Data
US 2018/0326983 A1    Nov. 15, 2018

(30) Foreign Application Priority Data
May 9, 2017    (CN) .......................... 2017 1 0320691

(51) Int. Cl.
*B60Q 7/00*    (2006.01)
*B25J 5/00*    (2006.01)
*B60W 30/14*    (2006.01)

(52) U.S. Cl.
CPC ............ *B60W 30/143* (2013.01); *B25J 5/007* (2013.01); *B60Q 7/00* (2013.01); *B60Q 2900/30* (2013.01);
(Continued)

(58) Field of Classification Search
CPC .. B60Q 7/00; B60Q 7/005; B60Q 7/02; E01F 9/65; E01F 9/662; G08G 1/0955; B25J 5/007; B60W 30/143
See application file for complete search history.

(56) References Cited

U.S. PATENT DOCUMENTS 9,561,589 B2 *   2/2017   Desai ..................... B25J 9/1651
9,902,317 B1 *   2/2018   Chuang ................... B60Q 1/52
(Continued)

FOREIGN PATENT DOCUMENTS

CN    103310715 A  *  9/2013
JP    2009083754 A  *  4/2009

OTHER PUBLICATIONS

Rudd, Robert, "Estimating the Mu Slip Curve via Extended Kalman Filtering", The Mathematica Journal 11:1 © 2008 Wolfram Media, Inc., pp. 91 to 106. (Year: 2008).*

(Continued)

*Primary Examiner* — Behrang Badii
*Assistant Examiner* — David A Testardi
(74) *Attorney, Agent, or Firm* — ScienBiziP, P.C.

(57) ABSTRACT

A control system for maintaining a traffic warning triangle at a constant speed when deployed, notwithstanding rises and falls in the road surface, includes a driver, a driving controller, a detector, and a processor. The driving controller controls the driver to drive the mobile warning triangle to move on a road at a predetermined speed. The detector obtains information as to the road. The processor outputs control signals to the driving controller to control the mobile warning triangle to move at the constant predetermined speed when moving. A control method of the mobile warning triangle is also provided.

8 Claims, 3 Drawing Sheets

(52) U.S. Cl.
CPC . *B60W 2510/081* (2013.01); *B60W 2550/142* (2013.01)

(56) References Cited

U.S. PATENT DOCUMENTS

| | | | |
|---|---|---|---|
| 9,927,811 B1* | 3/2018 | Tseng | G05D 1/0088 |
| 2002/0154947 A1* | 10/2002 | Farritor | E01F 15/006 |
| | | | 404/6 |
| 2006/0293819 A1* | 12/2006 | Harumoto | B60W 30/18145 |
| | | | 701/41 |
| 2008/0039990 A1* | 2/2008 | Stevens | G05D 1/0891 |
| | | | 701/22 |
| 2014/0005869 A1* | 1/2014 | Kubotani | B60L 15/20 |
| | | | 701/22 |
| 2015/0073623 A1* | 3/2015 | Zhang | G09F 13/16 |
| | | | 701/2 |
| 2016/0122956 A1* | 5/2016 | Christiansen | B60P 3/0255 |
| | | | 180/2.2 |
| 2016/0202077 A1* | 7/2016 | Huang | G06K 9/00805 |
| | | | 701/540 |
| 2017/0028986 A1* | 2/2017 | Kuroda | G01S 17/42 |
| 2017/0305338 A1* | 10/2017 | Lu | B60Q 7/00 |
| 2017/0313241 A1* | 11/2017 | Wu | B60Q 5/005 |

OTHER PUBLICATIONS

Johnson, Bryce, "Wheel Slip Simulation for Dynamic Road Load Simulation", Readout (journal), English Edition No. 42, Jul. 2014, Horiba Technical Reports, Reprint from Readout 38, pp. 50 to 55 (Year: 2014).*

* cited by examiner

SYSTEM AND METHOD FOR CONTROLLING MOBILE WARNING TRIANGLE

FIELD

The subject matter herein generally relates to road traffic safety.

BACKGROUND

A warning triangle raised at a distance from a broken-down car can warn other vehicles to slow down, change lanes. A current mobile warning triangle cannot adjust its own speed according to the slope of a road.

BRIEF DESCRIPTION OF THE DRAWINGS

Implementations of the present technology will now be described, by way of example only, with reference to the attached figures.

DETAILED DESCRIPTION

Figure 1:
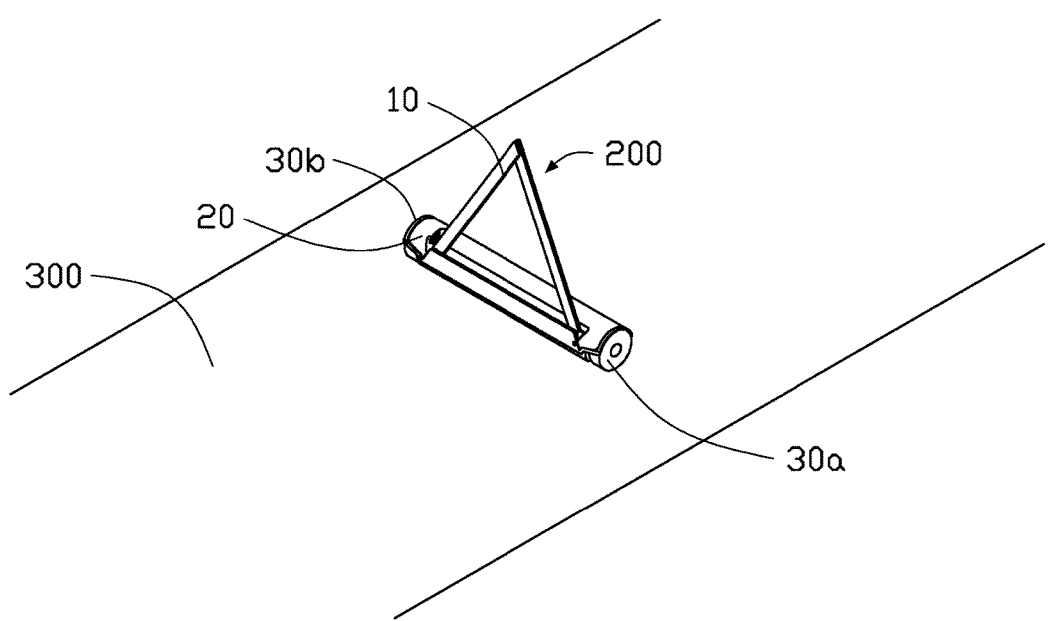
FIG. 1 is a diagram of an exemplary embodiment of a mobile warning triangle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a mobile warning triangle 200 in accordance with an exemplary embodiment.

Figure 2:
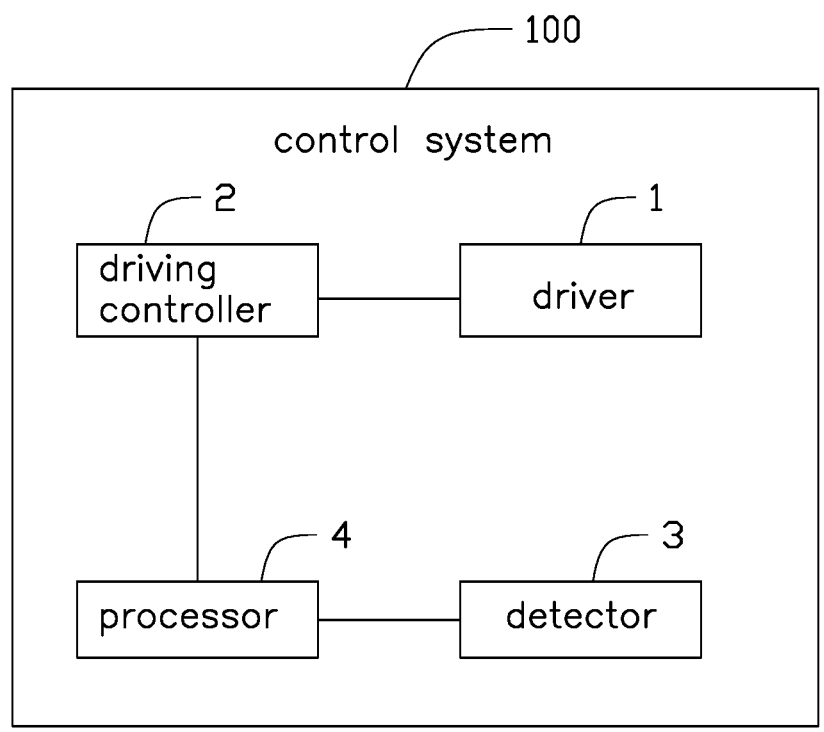
FIG. 2 is a block diagram of an exemplary embodiment of a control system of the mobile warning triangle.

The mobile warning triangle 200 comprises a warning triangle 10, a base 20, at least two wheels, and a control system 100 (shown in FIG. 2). The at least two wheels in this exemplary embodiment comprise two wheels 30a and 30b. The two wheels 30a and 30b are installed on two sides of the base 20. The control system 100 drives the mobile warning triangle 200 to move on a road 300.

For example, a car may break down on a expressway or in a tunnels, the mobile warning triangle 200 is raised at a first distance from the car to warn other vehicles to slow down or change lanes. The first distance can be 100 meters or 150 meters for example.

In one exemplary embodiment, the mobile warning triangle 200 can implement a route planning operation through connections to the Internet. For example, the mobile warning triangle 200 can connect to the Internet to use the global positioning system (GPS) technology to implement the route planning operation. The mobile warning triangle 200 also can connect to the Internet to receive the route planning operation, for example, from a cloud server.

Referring to FIG. 2, the control system 100 can comprise a driver 1, a driving controller 2, a detector 3, and a processor 4. The driving controller 2 is coupled to the driver 1, and controls the driver 1 to drive the mobile warning triangle 200 to move on the road 300 at a predetermined speed. The detector 3 obtains information of the road 300 (road information). The processor 4 is coupled to the driving controller 2 and the detector 3, the processor 4 outputs a corresponding control signal to the driving controller 2 according to the road information detected by the detector 3 to control the mobile warning triangle 200 to maintain the predetermined speed when moving.

In one exemplary embodiment, the driver 1 can be a motor. The driving controller 2 can be a motor controller. The detector 3 can comprise an accelerometer to obtain road information. The processor 4 can be a micro-programmed control unit (MCU).

In one exemplary embodiment, the processor 4 can further determine whether the road 300 is an uphill road, a downhill road, or a leveled road according to the road information.

When the processor 4 determines that the road 300 is an uphill road, the processor 4 outputs a first control signal to the driving controller 2 to increase the rotation speed of the driver 1 to control the mobile warning triangle 200 to maintain the predetermined speed. The control system 100 can prevent the mobile warning triangle 200 from stalling.

When the processor 4 determines that the road 300 is a downhill road, the processor 4 outputs a second control signal to the driving controller 2 to decrease the rotation speed of the driver 1 to control the mobile warning triangle 200 to maintain the predetermined speed. The control system 100 can prevent the mobile warning triangle 200 from losing direction because of speeding down uncertain ground.

When the processor 4 determines that the road 300 is a leveled road, the processor 4 outputs a third control signal to the driving controller 2 to maintain a constant rotation speed of the driver 1 to control the mobile warning triangle 200 to maintain the predetermined speed.

Figure 3:
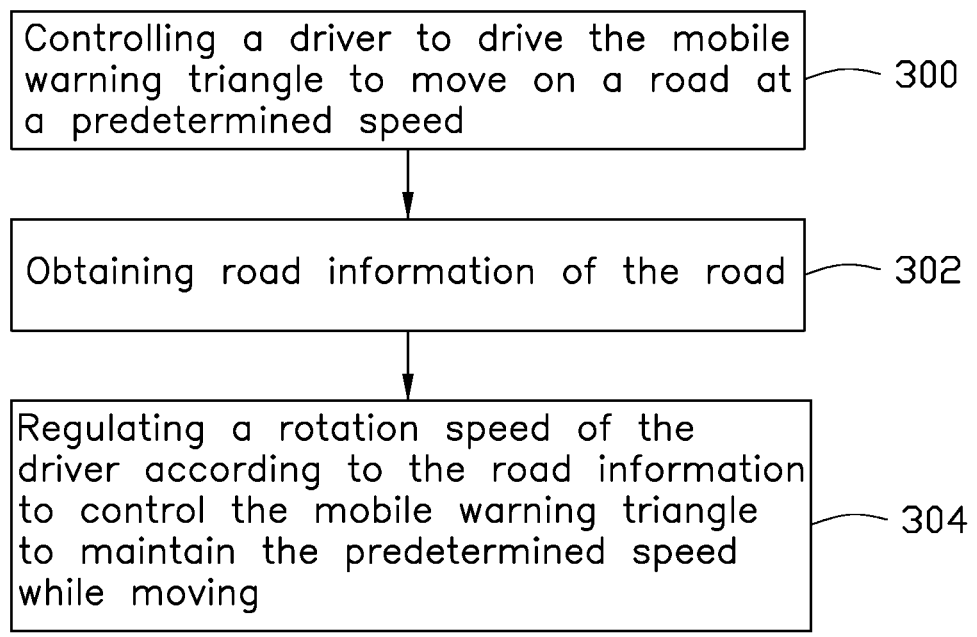
FIG. 3 is a flow diagram of an exemplary embodiment of a control method of the mobile warning triangle.

FIG. 3 illustrates one exemplary embodiment of a control method of the mobile warning triangle 200. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each step shown in FIG. 3 may represent one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step 300.

In step 300, the driving controller 2 controls the driver 1 to drive the mobile warning triangle 200 to move on the road 300 at a predetermined speed.

In step 302, the detector 3 obtains road information of the road 300.

In step 304, the processor 4 outputs a corresponding control signal to the driving controller 2 according to the road information to control the mobile warning triangle 200 to maintain the predetermined speed while moving.

In one exemplary embodiment, the processor 4 further determines the road 300 to be an uphill road, a downhill road, or a leveled road according to the road information.

When the processor 4 determines that the road 300 is an uphill road, the processor 4 outputs a first control signal to the driving controller 2 to increase the rotation speed of the driver 1 to control the mobile warning triangle 200 to maintain the predetermined speed.

When the processor 4 determines that the road 300 is a downhill road, the processor 4 outputs a second control signal to the driving controller 2 to decrease the rotation speed of the driver 1 to control the mobile warning triangle 200 to maintain the predetermined speed.

When the processor 4 determines that the road 300 is a leveled road, the processor 4 outputs a third control signal to the driving controller 2 to maintain a constant rotation speed of the driver 1 to control the mobile warning triangle 200 to maintain the predetermined speed.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A control method of a mobile warning triangle comprising:
controlling a driver to drive the mobile warning triangle to move on a road at a constant speed;
obtaining road information of the road; and
regulating a rotation speed of the driver according to the road information to control the mobile warning triangle to maintain the constant speed while moving;
wherein the step of regulating a rotation speed of the driver according to the road information to control the mobile warning triangle to maintain the constant speed to move comprises:
increasing the rotation speed of the driver directly to control the mobile warning triangle to maintain the constant speed to move in response to the road being an uphill road; and
decreasing the rotation speed of the driver directly to control the mobile warning triangle to maintain the constant speed to move in response to the road being a downhill road.

2. The control method of claim, wherein the step of regulating a rotation speed of the driver according to the road information of the road to control the mobile warning triangle to maintain the constant speed to move further comprises:
maintaining a constant rotation speed of the driver to control the mobile warning triangle to maintain the constant speed to move in response to the road being a leveled road.

3. A control system of a mobile warning triangle, the control system comprising:
a driver;
a driving controller coupled to the driver, the driving controller controlling the driver to drive the mobile warning triangle to move on a road at a constant speed;
a detector obtaining road information of the road; and
a processor coupled to the driving controller and the detector, the processor outputting a corresponding control signal to the driving controller according to the road information to control the mobile warning triangle to maintain the constant speed while moving
wherein the processor further determines whether the road is an uphill road, a downhill road, or a leveled road according to the road information; when the processor determines the road to be the uphill road, the processor outputs a first control signal to the driving controller to directly increase the rotation speed of the driver to control the mobile warning triangle to maintain the constant speed while moving; and when the processor determines the road to be the downhill road, the processor outputs a second control signal to the driving controller to directly decrease the rotation speed of the driver to control the mobile warning triangle to maintain the constant speed while moving.

4. The control system of claim 3, wherein the processor further implements a route planning operation through connections to the Internet.

5. The control system of claim 3, wherein when the processor determines the road to be the leveled road, the processor outputs a third control signal to the driving controller to maintain a constant rotation speed of the driver to control the mobile warning triangle to maintain the constant speed while moving.

6. A mobile warning triangle comprising:
a warning triangle;
a base;
at least two wheels installing on two sides of the base; and
a control system comprising:
a driver;
a driving controller coupled to the driver, the driving controller controlling the driver to drive the mobile warning triangle to move on a road at a constant speed;
a detector obtaining road information of the road; and
a processor coupled to the driving controller and the detector, the processor outputting a corresponding control signal to the driving controller according to the road information to control the mobile warning triangle to maintain the constant speed while moving
wherein the processor further determines whether the road is an uphill road, a downhill road, or a leveled road according to the road information of the road; when the processor determines the road to be the uphill road, the processor outputs a first control signal to the driving controller to directly increase the rotation speed of the driver to control the mobile warning triangle to maintain the constant speed while moving; and when the processor determines the road to be the downhill road, the processor outputs a second control signal to the driving controller to directly decrease the rotation speed of the driver to control the mobile warning triangle to maintain the constant speed while moving.

7. The mobile warning triangle of claim 6, wherein the processor further implements a route planning operation through connections to the Internet.

8. The mobile warning triangle of claim 6, wherein when the processor determines the road to be the leveled road, the processor outputs a third control signal to the driving controller to maintain a constant rotation speed of the driver to control the mobile warning triangle to maintain the constant speed while moving.

* * * * *